(12) United States Patent
Schum

(10) Patent No.: US 8,581,435 B2
(45) Date of Patent: Nov. 12, 2013

(54) WIND TURBINE HAVING MULTIPLE POWER GENERATING ELEMENTS

(76) Inventor: David Schum, Dallas, TX (US)

(*) Notice: Subject to any disclaimer, the term of this patent is extended or adjusted under 35 U.S.C. 154(b) by 228 days.

(21) Appl. No.: 13/157,701

(22) Filed: Jun. 10, 2011

(65) Prior Publication Data

US 2011/0304153 A1 Dec. 15, 2011

Related U.S. Application Data

(60) Provisional application No. 61/353,888, filed on Jun. 11, 2010.

(51) Int. Cl.
*F03D 9/00* (2006.01)

(52) U.S. Cl.
USPC .............................. 290/55; 290/44

(58) Field of Classification Search
USPC ...................................... 290/44, 55
See application file for complete search history.

(56) References Cited

U.S. PATENT DOCUMENTS

| | | | | |
|---|---|---|---|---|
| 4,318,019 | A | * | 3/1982 | Teasley et al. ........... 310/156.35 |
| 4,935,639 | A | * | 6/1990 | Yeh ................................. 290/55 |
| 6,242,818 | B1 | * | 6/2001 | Smedley ......................... 290/44 |
| 2005/0248160 | A1 | * | 11/2005 | Watkins ......................... 290/44 |
| 2008/0286112 | A1 | * | 11/2008 | Rowan et al. ............. 416/244 R |
| 2009/0097981 | A1 | * | 4/2009 | Gabrys ...................... 416/204 R |
| 2009/0102194 | A1 | * | 4/2009 | M'Ariza Garcia San Miguel et al. ............................... 290/44 |
| 2009/0167027 | A1 | * | 7/2009 | Kato ............................... 290/55 |
| 2009/0191057 | A1 | * | 7/2009 | Knutson ......................... 416/23 |
| 2011/0084494 | A1 | * | 4/2011 | Andujar ......................... 290/55 |

* cited by examiner

*Primary Examiner* — Tho D Ta

(57) ABSTRACT

Embodiments of the present disclosure include a wind turbine and a method of operating thereof. The wind turbine includes a central rod comprising an electrical coil and at least one rotating assembly configured to rotate around the central rod. The rotating assembly includes a wheel and a plurality of airfoils disposed around a perimeter of the wheel. The wind turbine also includes a magnet coupled to the at least one rotating assembly and configured to rotate around the central rod.

18 Claims, 8 Drawing Sheets

WIND TURBINE HAVING MULTIPLE POWER GENERATING ELEMENTS

CROSS-REFERENCE TO RELATED APPLICATION(S) AND CLAIM OF PRIORITY

The present application is related to U.S. Provisional Patent No. 61/353,888, filed Jun. 11, 2010, entitled "WIND TURBINE". Provisional Patent No. 61/353,888 is assigned to the assignee of the present application and is hereby incorporated by reference into the present application as if fully set forth herein. The present application hereby claims priority under 35 U.S.C. §119(e) to U.S. Provisional Patent No. 61/353,888.

TECHNICAL FIELD OF THE INVENTION

This disclosure is generally directed to wind-based energy generation and, more particularly, to a wind turbine system and method for generating electrical energy from wind power.

BACKGROUND OF THE INVENTION

Wind-based electricity generation has grown dramatically over the last decade, with the pace of growth accelerating over the last few years. Wind serves as an alternative to more conventional electricity generation sources such as coal, gas, and nuclear. Wind turbines can convert wind energy, to mechanical energy, to electrical energy. Some traditional models of wind turbines include three blades that rotate on a horizontal axis. These turbines and others have various disadvantages, including noise and undesirable overall efficiency.

SUMMARY OF THE INVENTION

According to an embodiment of the present disclosure, a wind turbine includes a central rod comprising an electrical coil and at least one rotating assembly configured to rotate around the central rod. The rotating assembly includes a wheel and a plurality of airfoils disposed around a perimeter of the wheel. The wind turbine also includes a magnet coupled to the at least one rotating assembly and configured to rotate around the central rod.

In another embodiment, a method of operating a wind turbine includes rotating at least one rotating assembly around a central rod. The central rod includes an electrical coil, and the rotating assembly includes a wheel and a plurality of airfoils disposed around a perimeter of the wheel. The method also includes rotating a magnet around the central rod, the magnet coupled to the at least one rotating assembly.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein. Like numbers refer to like elements throughout.

An electrical power-generating wind turbine is disclosed herein that can utilize one or more airfoils around the perimeter of a wheel to generate rotational movement. In accordance with some embodiments, an outer wheel with airfoils is attached via a number of radial spokes (sometimes referred to herein as radial supports) to a smaller inner wheel that can be composed of at least one Rare Earth Magnet ("REM"). The outer and inner wheels can rotate around a central rod, which may be comprised of a coiled metallic wire or other type of conductor (such as carbon nanowires) that is wound thereon. The REM can be oriented in such a way that the rotational movement generates an electric current according to Faraday's Law.

The wind turbine can include multiple airfoil wheels of different diameters arranged in such a fashion that they align along the axis normal to the direction of rotation. One or more subsequent wheels can be sized to utilize the wind that passes through the preceding wheel. The cone created by the wheels configured thusly can allow the wind turbine to utilize most or all of the wind energy incident upon the wind turbine.

The wind turbine can also include airfoils that are allowed to vary in pitch. By attaching the airfoils to a spring system which is balanced in such a way that the pitch of the airfoils is set by the speed of the incoming wind, a constant angular velocity can be achieved in some embodiments, regardless of wind speed.

The central rod can be attached to one or more airfoil wheels. The airfoils connected to the central rod can be oriented in such a manner that the wind turbine generates a rotational force in a direction opposite that generated in the REM wheel.

Figure 1:
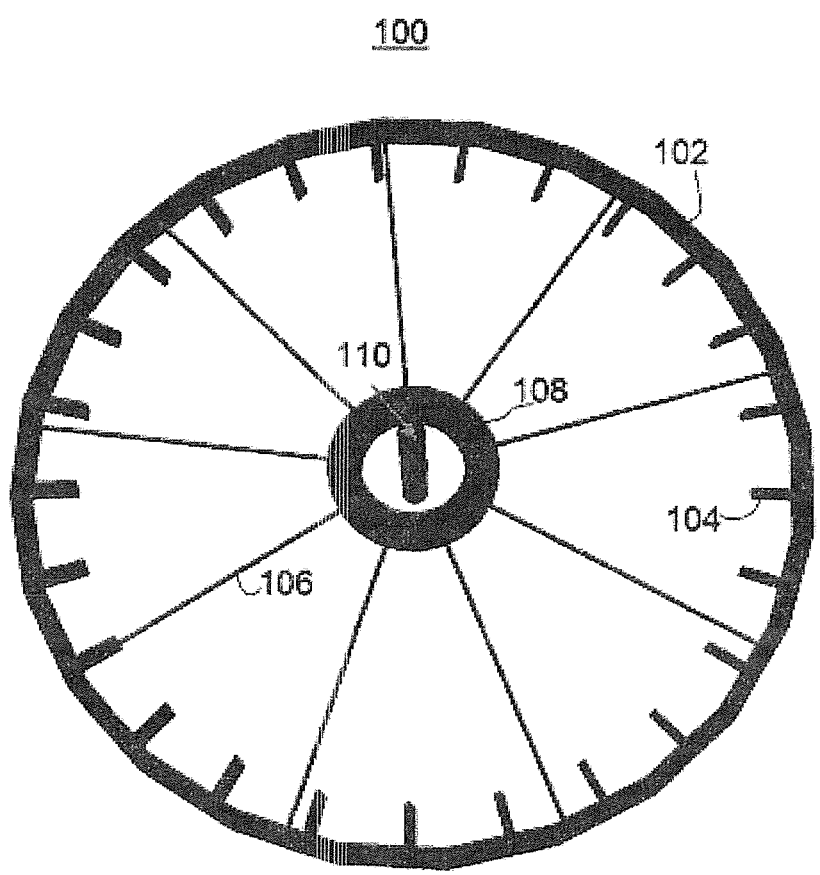
FIG. 1 a front view of a wind turbine having a single rotating assembly adapted in the center to receive a rod, according to an embodiment of the present disclosure.

FIG. 1 illustrates a front view of a wind turbine having a single rotating assembly adapted in the center to receive a rod, according to an embodiment of the present disclosure. The embodiment of wind turbine 100 shown in FIG. 1 is for illustration only. Other embodiments of wind turbine 100 could be used without departing from the scope of this disclosure.

Wind turbine 100 includes a single rotating assembly and central rod 110. The rotating assembly may comprise outer wheel 102, airfoils 104, radial supports 106, and magnetic ring 108. Outer wheel 102 can be circular, almost circular (as shown in FIG. 1), polyhedral, or any other shape that allows rotation of outer wheel 102 from wind pressure applied to airfoils 104. Outer wheel 102 can have any suitable diameter, as aspects of its design can be scalable. For example, outer wheel 102 may have a diameter of less than half a meter (e.g., when adapted to be attached to an automobile's bumper, underbelly, or other location likely to have sufficient wind pressure while driving), a meter (e.g., when adapted for a personal home), ten meters (e.g., when adapted for a commercial building or complex), or more than ten meters (e.g., when adapted for a dedicated power generation facility), just to list a few examples. Outer wheel 102 can be formed from metal, plastic, any other suitable material, or a combination thereof. Outer wheel 102 may also be hollow, solid, porous, cavernous, or a combination thereof.

As shown in FIG. 1, outer wheel 102 includes a plurality of airfoils 104 attached thereto. Airfoils 104 may be attached to the inside of outer wheel 102 (as shown in FIG. 1), or attached to the outside of outer wheel 102 (not shown). Regardless of whether airfoils 104 are attached to the inside or outside of outer wheel 102, airfoils 104 can be configured to capture wind power from wind moving substantially parallel to central rod 110.

In other embodiments, airfoils 104 may be attached to the outside rim of outer wheel 102 and be configured to capture wind power of wind moving substantially perpendicular to central rod 110. By capturing wind moving perpendicular to central rod 110, wind turbine 100 can be configured to be oriented vertically (causing the view in FIG. 1 to be a top view, instead of a front view). The vertically oriented embodiments of wind turbine 100 may be advantageous when affixed to a house or other structure. In a vertically oriented embodiment, central rod 110 may couple to a home's roof or yard, and extend substantially vertically to elevate and support wind turbine 100 in the air.

Airfoils 104 can be adapted to generate lift and/or receive a wind force as a result of being exposed to wind (or other type of fluidic movement), which is sometimes referred to herein as "capturing" wind energy (or other type of fluid energy). Although embodiments of the present disclosure can be adapted for various types of fluids, the embodiments discussed herein primarily reference the movement of air, namely "wind." Some embodiments can be used with other types of fluids (such as water) or be modified specifically for the capturing of energy from the movement of other types of fluids.

The capturing of wind energy causes outer wheel 102 to rotate. Airfoils 104 are shown in FIG. 1 as being relatively small in height as compared to radial support 106. In some embodiments, one or more airfoils 104 can be of a relatively larger height and/or relatively smaller height. For example, airfoils attached to the outside rim of outer wheel 102 (not shown) can have a larger height than airfoils 104. Airfoils 104 can also be retractable into outer wheel 102. Any suitable number of airfoils 104 can be included in the rotating assembly shown in FIG. 1. Airfoils 104 can be formed from metal, plastic, any other material suitable for capturing wind, or a combination thereof.

In some embodiments, one or more airfoils 104 can include a flat surface onto which wind may apply a force that causes outer wheel 102 to rotate. In other embodiments, one or more airfoils 104 can be wing-shaped and include a rounded leading edge and a relatively sharp trailing edge. Airfoils 104 can be angled to capture wind traveling parallel to central rod 110. For example, one or more of airfoils 104 can be attached in a fixed position to outer wheel 102. In other embodiments, one or more of airfoils 104 can be attached to outer wheel 102 such that airfoils 104 are able to rotate along a radial axis orthogonal to a tangential line at the airfoil's contact point with outer wheel 102 (e.g., like a ship rudder). Allowing rotation of one or more airfoils 104 can optimize the amount of lift created from a given wind speed, thereby increasing the generation of electricity and the system's overall efficiency without destabilizing the system. Additionally, rotation of one or more airfoils 104 may enable airfoils 104 to comprise some types of materials that may otherwise not be suitable for airfoils 104 (e.g., due to lack of strength and/or rigidity).

A moveable airfoil, utilizing a flat surface or wing-shaped surface, may be manually, automatically, and/or electronically adjusted in high or low speed wind conditions to reduce or increase the perpendicularity of the airfoil angle with respect to the wind direction and/or reduce or increase the amount of lift generated by the airfoil. One or more different components may be incorporated into the rotating assembly to enable the rotation and/or other type of movement of airfoils 104. For example, one or more airfoils 104 can be attached to outer wheel 102 by means of a spring-loaded hinge. The spring-loaded hinge may enable the angle of the airfoil to automatically and dynamically change with respect to outer wheel 102 based upon the current wind speed and air pressure. As another example, one or more airfoils 104 may be configured for manipulation by motors, such as micro step motors, that control the airfoil angle with respect to outer wheel 102.

As noted above, airfoil angle adjustment can be used to increase stability while experiencing high wind speeds and/or during inconsistent wind conditions. Another advantage that may be realized includes an increase in efficiency in low speed wind conditions (e.g., by increasing the lift by adjusting the angle perpendicularity and/or shape of one or more airfoils 104, which may lead to a greater rotational speed of the rotating assembly). For example, flat airfoils can be angled into the wind during high wind speeds to reduce the force applied to the flat surface. As another example, wing-shaped airfoils can be inflated or otherwise adjusted such that the length of the flat side and/or curved side can be adjusted to change the distance the air travels over each side, which may affect the amount of lift generated by the airfoil, In some embodiments, airfoils 104 can be formed at least partially from a flexible material, such as rubber, metal (including a memory metal), plastic, or any other suitable material that can aid in allowing airfoils 104 to change their angles in response to varying wind conditions with or without the use of hinges, motors, and/or other components.

Radial supports 106 can connect outer wheel 102 with magnetic ring 108. Radial supports 106 can be of any number and can also be of any thickness. In some embodiments, the thickness of radial support 106 may be determined such that there is minimal obstruction of the wind turbine operation and turbulence behind the rotating assembly while maintaining structural support of the rotating assembly. Radial supports 106 can be formed from metal, plastic, any other material suitable for supporting outer wheel 102 and magnetic ring 108, or a combination thereof. In some embodiments, radial supports 106 may be straight (as shown in FIG. 1). Radial supports 106 may be arranged in a radial pattern as shown in FIG. 1. In other embodiments, radial supports 106 may comprise another suitable arrangement (such as being curved, arranged in a grid-like pattern, or another pattern) that would provide connectivity and support for outer wheel 102 and magnetic ring 108.

In some embodiments, such as that shown in FIG. 1, magnetic ring 108 can be within outer wheel 102 and surround central rod 110. Magnetic ring 108 can be connected to outer wheel 102 by radial supports 106. Magnetic ring 108 can include one or more magnets (such as Rare Earth Magnets) that may be located within or affixed to an assembly formed from metal, plastic, any other material suitable for supporting magnetic ring 108, or a combination thereof. Magnetic ring 108 is operable to rotate around central rod 110 in response to airfoils 104 capturing wind energy. In some embodiments, magnetic ring 108 can rotate independently around central rod 110 by use of bearings, slip rings, or other suitable means that allow rotational movement of the rotating assembly with respect to central rod 110. Magnetic ring 108 can be of any size and shape, including a polyhedral shape. Magnetic ring 108 can have any suitable magnetic properties. For example, magnetic ring 108 can be diametrically magnetized. In some embodiments, magnetic ring 108 does not have to be physically connected to central rod 110 (using bearings and/or other components) and can instead "hover" around the central rod 110. This can be accomplished by, for example, creating a repelling magnetic field in central rod 110, mounting outer wheel 102 to a housing (such as the outer shell discussed below), or by another suitable means.

Central rod 110 can include, for example, a single rod or a series of rods wrapped in one or more conductive materials. The conductive material may be of any shape or form. For example, the conductive material may be a wire made from gold, copper, another metal, or any other suitable conductive material (such as a carbon nanowire). The conductive material can form a coil around central rod 110. In some embodiments, central rod 110 can be fixed with respect to the rotation of magnetic ring 108. In other embodiments, systems can be configured to enable central rod 110 to rotate in a direction opposite to that of magnetic ring 108, thereby increasing the relative rotational speed of magnetic ring 108 with respect to central rod 110. The increased relative rotational speed can cause an increase in electrical power that is generated by wind turbine 100.

As airfoils 104 are subjected to wind force and capture wind energy, the rotating assembly can convert the wind energy to mechanical energy in the form of rotational movement, which in turn can include the rotation of magnetic ring 108. The rotation of magnetic ring 108 can create a changing magnetic field with respect to the conductive material of central rod 110. The changing magnetic field can induce an increased voltage potential in central rod 110. The increased voltage potential can cause an electrical current to travel along central rod 110, thereby completing the conversion of wind energy to mechanical energy, and then to electrical energy. The electrical current in the coil can be conducted to a central wire or other power generation unit that can then provide power to an external device (such as a battery, electrical grid, or other electrical device and system). As another example, a user may have a small handheld device incorporating wind turbine 100, which may be waved or otherwise moved through the air (including twirled on a tether) to generate power for a battery of a cellular phone or other type of portable device.

Although FIG. 1 depicts one example of a wind turbine 100, various changes may be made to FIG. 1. For example, while every airfoil 104 is shown as having substantially the same height, in other embodiments, certain airfoils 104 may have different heights than other airfoils. As another example, central rod 110 may include one or more links, hinges, fasteners, or other suitable parts.

Figure 2:
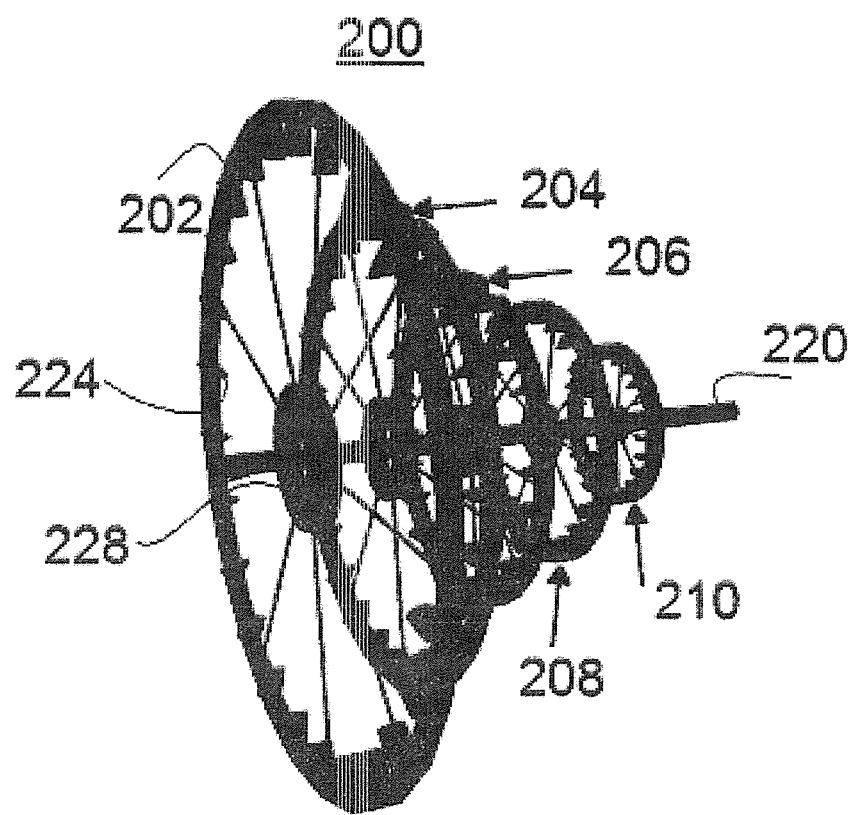
FIG. 2 illustrates an isometric view of a wind turbine having a plurality of rotating assemblies adapted to rotate around a common rod, according to an embodiment of the present disclosure.

FIG. 2 illustrates an isometric view of a wind turbine having a plurality of rotating assemblies adapted to rotate around a common rod, according to an embodiment of the present disclosure. The embodiment of wind turbine 200 shown in FIG. 2 is for illustration only. Other embodiments of wind turbine 200 could be used without departing from the scope of this disclosure.

Wind turbine 200 includes multiple rotating assemblies 202, 204, 206, 208, 210 each having an outer wheel and other components similar to those discussed in connection with the rotating assembly of wind turbine 100. For example, each outer wheel can include airfoils 224 similar to or the same as airfoils 104 discussed above. Each outer wheel of rotating assemblies 202-210 can have a different diameter than the others as shown in FIG. 2.

In other embodiments, one or more of rotating assemblies 202-210 can have the same or substantially similar diameters. For example, in embodiments including a wind turbine configured to be oriented vertically (e.g., having airfoils 224 configured to capture the wind power of wind moving perpendicular to central rod 220), each outer wheel of rotating assemblies 202-210 can have the same or substantially the same diameter.

In some embodiments, the plurality of rotating assemblies can be arranged such that the outer diameters of rotating assemblies 202-210 decrease in the direction the wind travels. For example, wind turbine 200 can be adapted to receive wind from the rotating assembly 202. In other embodiments, the plurality of rotating assemblies can be arranged such that the outer diameters of rotating assemblies 202-210 increase in the direction the wind travels. For example, wind turbine 200 can be adapted to receive wind from the rotating assembly 210.

Rotating assemblies 202-210 can also share a common central rod 220. Central rod 220 can be configured to receive electricity generated by any number of rotating assemblies 202-210.

Each rotating assembly 202-210 can be configured to independently create a moving magnetic field from its respective magnetic ring 228 around the conductive material of central rod 220. In some embodiments, the rotating assemblies 202-210 (and their magnetic rings 228) are evenly spaced. In other embodiments, the intervals between adjacent rotating assemblies 202-210 (and/or their magnetic rings) may vary.

One advantage of wind turbines having multiple rotating assemblies includes the potential to create more electrical power from each available unit of wind power as compared to a wind turbine having a single rotating assembly. For example, wind turbine system 200, which includes multiple rotating assemblies, may be able to support more airfoils 104 than wind turbine system 100, which has a single rotating assembly as shown in FIG. 1. This allows the same amount of wind to turn multiple magnetic rings 228, which can generate greater electrical current than a single magnetic ring.

Additionally, in some embodiments, central rod 220 can be attached to one or more of assemblies 202, 204, 206, 208, 210 and rotate in an opposite direction to one or more other rotating assemblies, creating a relatively larger magnetic field change. The larger magnetic field may create a larger electrical current in the electrically conductive material of central rod 220. This is described in greater detail below.

Although FIG. 2 depicts one example of a wind turbine 200, various changes may be made to FIG. 2. For example, while wind turbine 200 is shown without a housing, in other embodiments, wind turbine 200 can be housed within an outer shell or other structure that partially or completely surrounds wind turbine 200. As another example, central rod 220 may include one or more links, hinges, fasteners, or other suitable parts.

Figure 3:
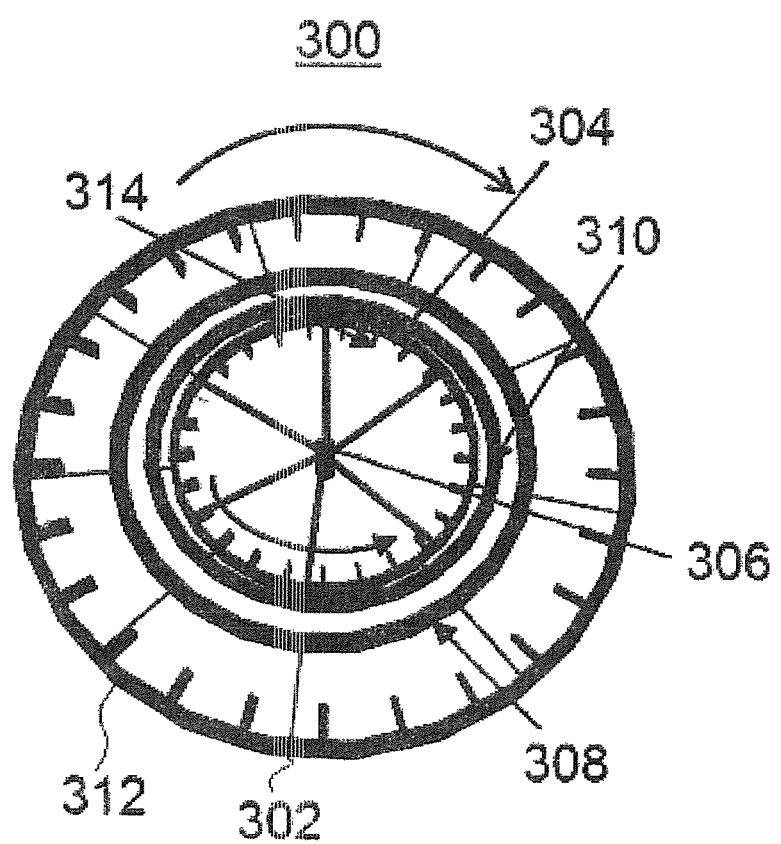
FIG. 3 illustrates a front view of a wind turbine having an inner assembly and an outer assembly configured to rotate in opposite directions, according to an embodiment of the present disclosure.

FIG. 3 illustrates a front view of a wind turbine having an inner assembly and an outer assembly configured to rotate in opposite directions, according to an embodiment of the present disclosure. The embodiment of wind turbine 300 shown in FIG. 3 is for illustration only. Other embodiments of wind turbine 300 could be used without departing from the scope of this disclosure.

Wind turbine 300 includes outer assembly 302 and inner assembly 304. Rather than having a central rod that includes conductive material used to generate and convey electrical power (such as central rod 110 and 220), wind turbine 300 includes support bar 306 that may be strong enough to support outer assembly 302 and/or act as a conduit for a wire carrying electricity generated by outer assembly 302 and inner assembly 304.

In some embodiments, support bar 306 can be physically attached to inner assembly 304. Outer wheel 308 of inner assembly 304 can include conductive material coiled and/or otherwise attached thereto. Inner assembly 304 can also include airfoils similar to or the same as airfoils 104, 224 discussed above. Outer wheel 308 of inner assembly 304 can include a rare earth magnet or other type of magnet or conductive material(s). For example, metal wire may be coiled and/or otherwise attached to outer wheel 308. Outer wheel 302 can also include airfoils similar to or the same as airfoils 104, 224 discussed above. In other embodiments, such as that shown in FIG. 3, outer wheel 308 can be coupled to induction wheel 310, which can include one or more rare earth magnets or other type of magnets and/or electrically conductive materials, by means of radial supports, such as radial supports 106 discussed above. One or more of inner assembly 304's radial, supports may transfer electricity to support bar 306 (e.g., by acting as a conduit for a wire, by being comprised of electrically conductive material, or by any other means).

Outer assembly 302 can include airfoils attached to its outer wheel 312. Similar to the assembly of turbine system 100, radial supports may be used to couple outer wheel 312 to inner wheel 314. Inner wheel 314 may include, for example, magnetic material(s), electrically conductive materials, or a combination thereof.

The airfoils included in outer assembly 302 and inner assembly 304 can cause outer assembly 302 to rotate independently in an opposite direction than inner assembly 304. The opposite rotational direction of outer assembly 302 and inner assembly 304 may result in an increased rotational differential between, e.g., the electrical materials on induction wheel 310 and the magnetic material of inner wheel 314. An electrical current may be generated in electrically conductive material of inner assembly 304, which may be conveyed to support bar 306 and transferred to a remote electrical device.

Although FIG. 3 depicts one example of a wind turbine 300, various changes may be made to FIG. 3. For example, the inner/outer assembly structure of wind turbine 300 can be used in a multi-diameter assembly system, such as that shown in FIG. 2. In such embodiments, one or more of assemblies 202, 204, 206, 208, 210 can be adapted to include an inner assembly, similar to or the same as assembly 304.

Figure 4A:
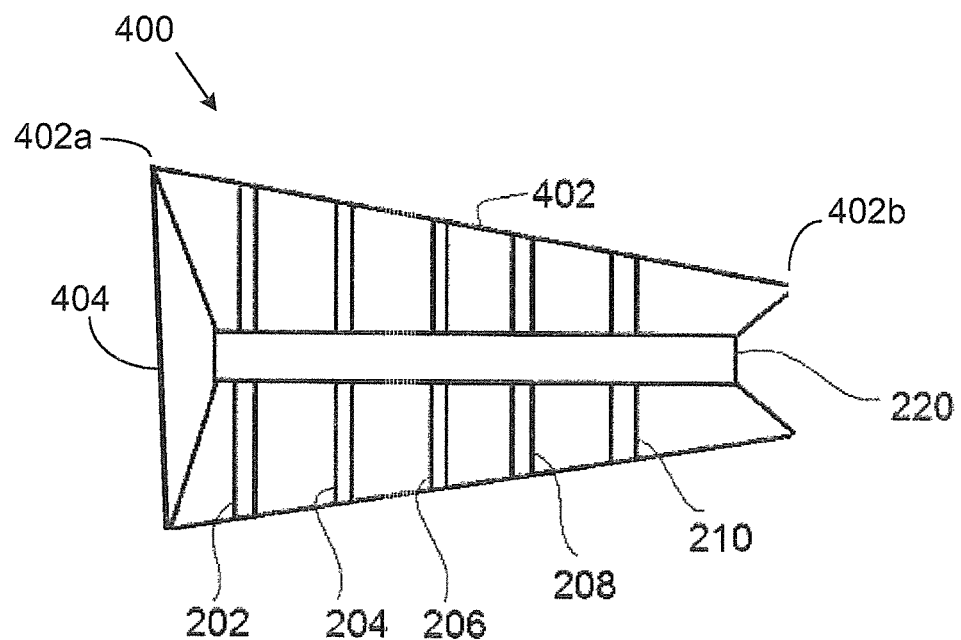
FIGS. 4A and 4B illustrate a side cross-section view and a front view, respectively, of a wind turbine that includes a housing unit, according to an embodiment of the present disclosure.
Figure 4B:
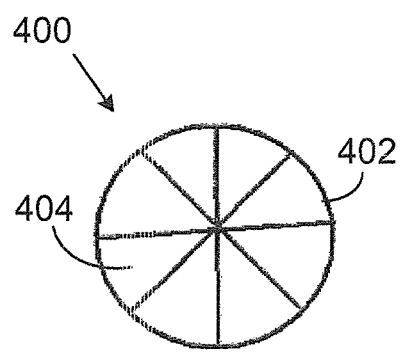

FIGS. 4A and 4B illustrate a side cross-section view and a front view, respectively, of a wind turbine that includes an outer shell housing unit, according to an embodiment of the present disclosure. The embodiment of wind turbine 400 shown in FIGS. 4A and 4B is for illustration only. Other embodiments of wind turbine 400 could be used without departing from the scope of this disclosure.

Wind turbine 400 can include one or more rotating assemblies 202-210, such as those discussed above, and can be enclosed or surrounded by an outer shell housing unit (or simply "outer shell") 402. In some embodiments, a mesh grill or cover 404 may be affixed to the wind intake opening of outer shell 402 so as to allow air flow to enter the rotating assemblies, while preventing birds and/or other objects from entering and becoming trapped within wind turbine 400. Mesh cover 404 can be formed from any material, including metal, plastic, any other material suitable as a mesh, or a combination thereof. In some embodiments, mesh 404 can take the form of lattice, parallel bars, and/or any other design. In some embodiments, outer shell 402 is coupled to and pivots around a support structure, as described in greater detail below.

As shown in FIGS. 4A and 4B, outer shell 402 can include a substantially circular cross section, and have a relatively larger front opening 402a where the wind enters. Outer shell 402 gradually narrows or tapers to a relatively narrower back opening 402b where the wind exits. Thus, outer shell 402 generally resembles a truncated cone, or frustum. As known the art, the shape of outer shell 402 can cause wind entering front opening 402a to "funnel" and accelerate as the wind moves toward the narrower back opening 402b. The ratio between the size of the front opening 402a and back opening 402b and the length of the outer shell 402 can be determined according to engineering tests to produce a desired acceleration.

In some embodiments, airfoils 224 of rotating assemblies 202-210 can be designed to provide greater efficiency at different wind speeds. For example, airfoils 224 on rotating assembly 202 closest to opening 402a can be designed to be most efficient at 3 or 4 miles per hour (mph) wind speed. The next rotating assembly 204 can be designed to be most efficient at 14 mph. The third rotating assembly 206 can be designed to be most efficient at 24 mph, and so forth. Thus, as the wind accelerates as it moves through outer shell 402, the wind encounters rotating assemblies designed to be more efficient at higher wind speeds. This configuration promotes greater overall efficiency of wind turbine 400.

In some embodiments, the outer shell 402 can remain fixed with respect to the movement of the inner rotating assemblies and/or the central rod of wind turbine 400. In addition to or instead of functioning as a protective housing, outer shell 402 can also channel wind and/or direct wind into wind turbine 400, similar to or the same as how a wind sock moves with the wind to show wind direction.

In other embodiments, outer shell 402 can be affixed to and rotate with central rod 220 of wind turbine 400. In these embodiments, outer shell 402 may also possess internal and/or external airfoils (not shown) that aid in and/or result in outer shell 402 rotating. In some embodiments, outer shell 402 may also be affixed to one or more internal rotating assemblies and help increase rotational velocity of rotating assemblies with respect to the central rod 110. Outer shell 402 can be formed of the same or different material as the other components of wind turbine 400 and can be formed of any metal, plastic, any other material suitable as an outer shell, or a combination thereof.

As shown in FIGS. 4A and 4B, outer shell 402 can allow wind turbine 400 to be used in situations that may not be advantageous for traditional wind turbines. For example, in some embodiments, wind turbine 400 could be affixed to a moving vehicle (e.g., an automobile). In such an embodiment, wind turbine 400 would allow for electricity generation that could be used, for example, to charge the vehicle battery or another such activity. Wind turbine 400 and other embodiments discussed herein could also be mounted in similar fashion to that of traditional wind turbine systems. Outer shell 402 can also be adapted to automatically direct wind turbine 400 into the prevailing wind.

Although FIGS. 4A and 4B depict one example of a wind turbine 400, various changes may be made to FIGS. 4A and 4B. For example, while wind turbine 400 is shown with five rotating assemblies 202-210, in other embodiments, wind turbine 400 may have more or fewer rotating assemblies. As another example, while mesh cover 404 is shown as being substantially flat, in other embodiments, mesh cover 404 may be convex, concave, or have any other suitable shape.

Figure 4C:
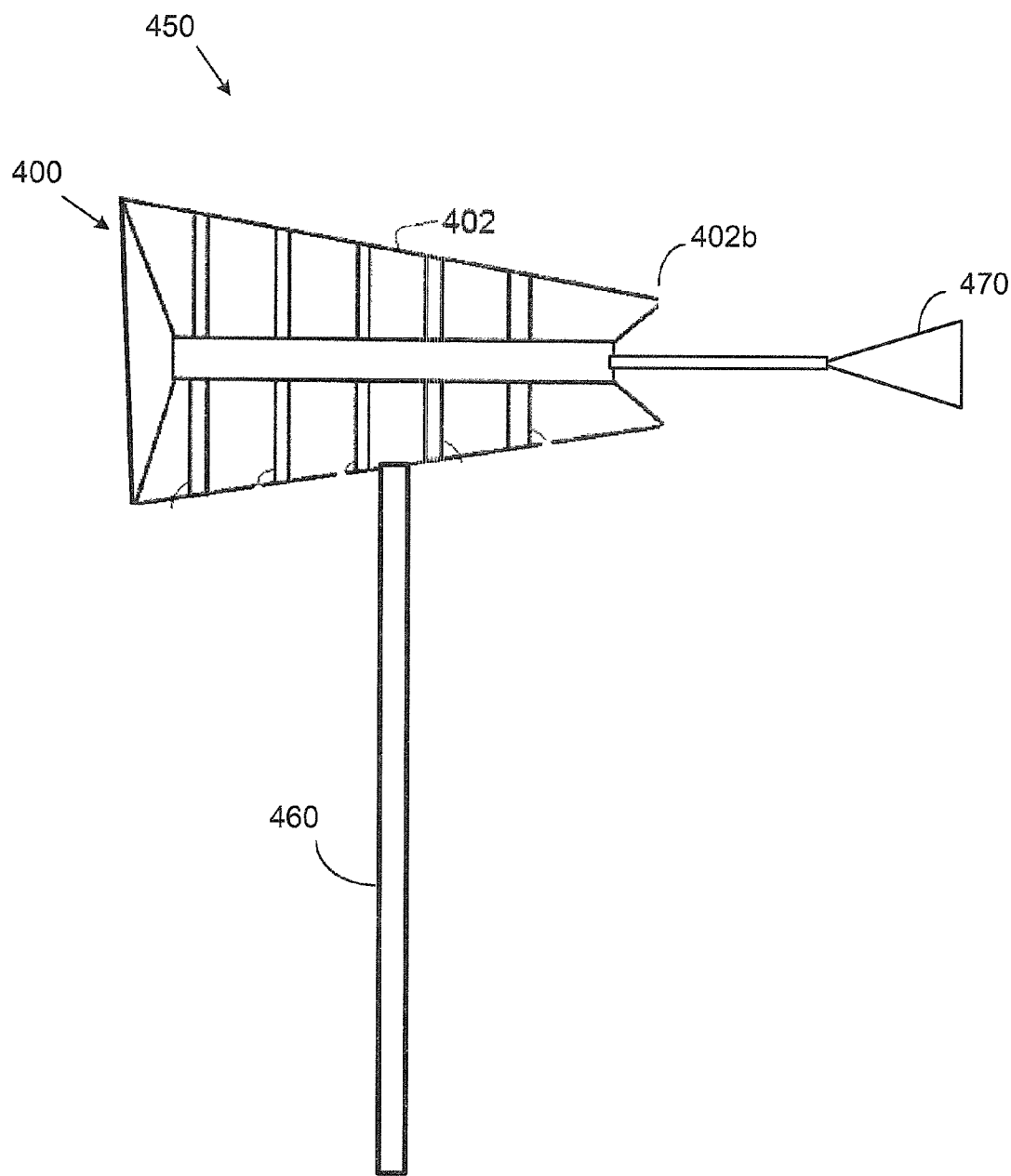
FIG. 4C illustrates a side view of a wind turbine structure having a support pole, according to an embodiment of the present disclosure.

FIG. 4C illustrates a side view of a wind turbine structure having a support pole, according to an embodiment of the present disclosure. The embodiment of wind turbine structure 450 shown in FIG. 4C is for illustration only. Other embodiments of wind turbine structure 450 could be used without departing from the scope of this disclosure.

Wind turbine structure 450 includes a wind turbine, such as wind turbine 400, and a support structure 460. Support structure 460 provides support for wind turbine 400 and couples wind turbine 400 to a suitable base. As described above, depending on the application of the wind turbine 400, the base may include a platform on the ground, a roof of a home or structure, a vehicle bumper, and so forth. Thus, support structure 460 can be scaled according to the dimensions of wind turbine 400 and the associated base.

As shown in FIG. 4C, support structure 460 can include a vertical pole that is coupled to outer shell 402 of wind turbine 400. In an embodiment, support structure 460 attaches at or near the center of outer shell 402. In another embodiment, support structure 460 may attach at or near one end of outer shell 402. Support structure 460 can be hollow and can have one or more electrical wires that run through the hollow space. The one or more electrical wires can be connected at one end to the center rod 220 or the surrounding electrical coil of wind turbine 400. In an embodiment, the electrical wires can connect to the electrical coil via a slip ring assembly that allows free rotation of the coil and a path for the generated electrical power. The one or more electrical wires can be connected at the other end to a destination for the generated electrical power. In certain embodiments, the destination can be a converter, a battery, or an electrical grid.

Wind turbine structure 450 can include a tail, "shark fin", or wind vane 470 configured to assist in orienting wind turbine 400 to the prevailing wind. In an embodiment, wind vane 470 can extend axially from back opening 402b of outer shell 402.

Although FIG. 4C depicts one example of a wind turbine structure 450, various changes may be made to FIG. 4C. For example, while support structure 460 has been described as including a vertical pole, in other embodiments, support structure 460 can include additional or alternative structures, such as a frame, scaffold, tripod, or any other suitable structure. Additionally, support structure 460 can be oriented horizontally, at an angle, in any other suitable direction.

A processor may be included in wind turbines in accordance with some embodiments discussed herein. The processor may be configured to operate under control of a computer program product stored on non-transitory computer readable media storage devices (e.g., memory) included in the wind turbines or elsewhere. For example, the processor may access the memory that stores one or more application programs or other software executed by the processor to control the operation of the wind turbine. As will be appreciated, any such computer program instructions may be downloaded (pushed or pulled) to or by a computer or other programmable apparatus (e.g., the processor) of the wind turbine.

In some embodiments, the wind turbine may also include a battery or other rechargeable source of power that is charged by the electrical energy generated by the wind turbine. The battery and/or electrical power generated by the wind turbine can be used to power the circuitry of the wind turbine.

Figure 5:
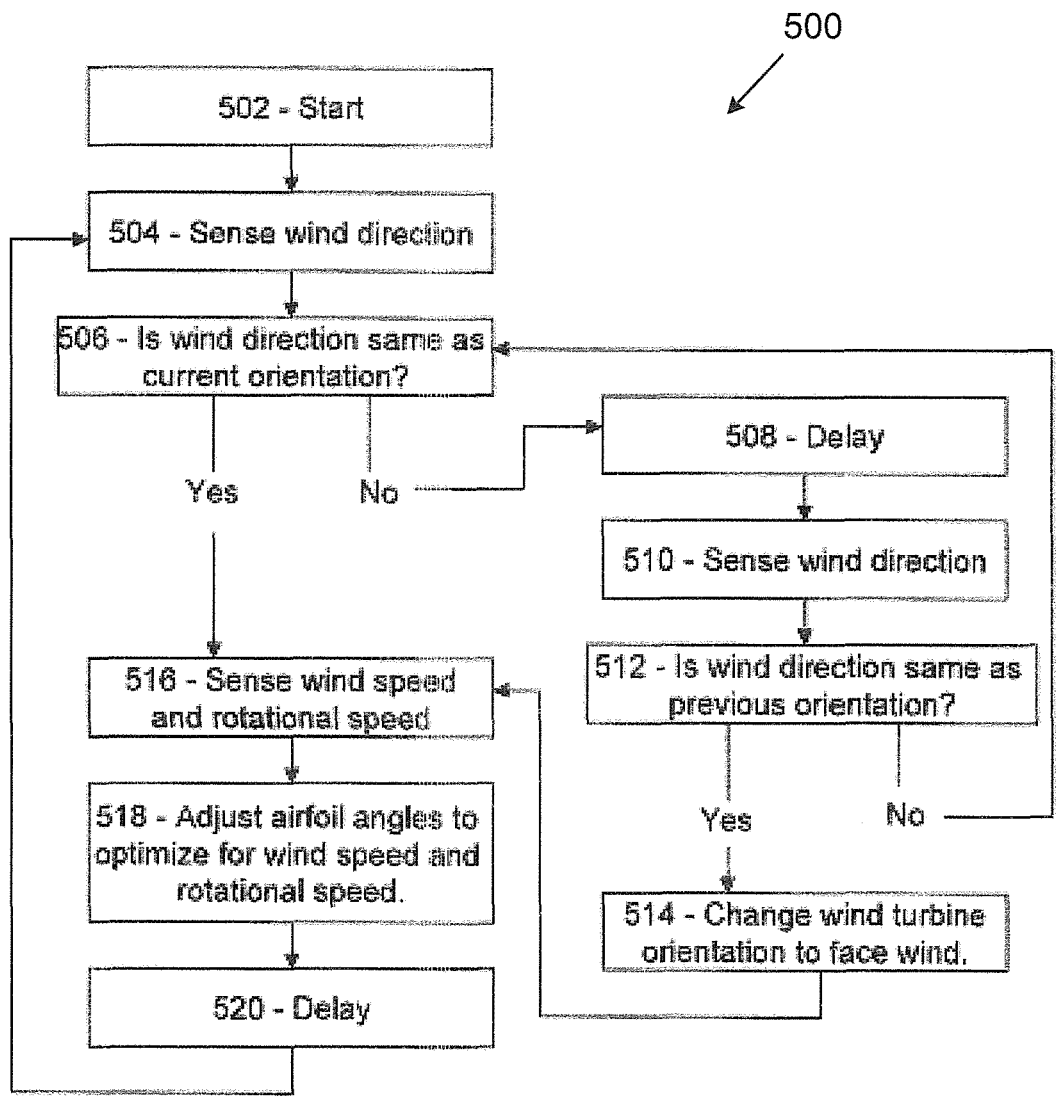
FIG. 5 illustrates a method for controlling a wind turbine to optimize operational efficiency based on prevailing wind conditions, according to an embodiment of the present disclosure.

FIG. 5 illustrates a method for controlling a wind turbine to optimize operational efficiency based on prevailing wind conditions, according to an embodiment of the present disclosure. The method shown in FIG. 5 is for illustration only. Other embodiments of the method could be used without departing from the scope of this disclosure.

Method 500 starts at block 502. Next, at block 504, current wind direction is determined. The wind direction can be determined using sensors, a mechanical device (e.g., a fin or wind vane incorporated into the wind turbine), the housing itself (which may act similar to or the same as a windsock), etc.

At block 506, a determination is made after a comparison of the wind direction to the orientation of the wind turbine. In response to determining the wind direction is the same as the current orientation of the wind turbine, an airfoil calibration can be started at block 516. In response to determining the wind direction is not the same as the current orientation of the wind turbine system, a delay can be implemented at block 508, and the wind direction can be determined again at block 510 after the delay. The delay may be one or more seconds, a fraction of a second, or any other suitable amount of time needed.

At block 512, another determination can be made based on wind direction. If the wind direction is the same as the previously determined wind direction, it may be assumed that the wind direction is stable enough for consistent operation of the wind turbine without causing damage (e.g., the wind is not changing too quickly). As a result, the orientation of the wind turbine can be changed at block 514 to allow the wind energy to be provided to the wind turbine. For example, an electrical motor can cause the wind turbine to turn into the wind.

In other embodiments, in addition to or instead of changing the orientation of the wind turbine relative to the direction of the wind, the wind turbine may include one or more components that may be used to obstruct the flow of the wind into the wind turbine. For example, a circular air bladder may be positioned at the intake portion of the wind turbine and, upon being filled with air, at least partially block some or all of the wind from entering into the wind turbine. As another example, a grate or other type of wind obstructing component may be used to prevent at least some wind from entering the wind turbine.

After changing the orientation of the wind turbine, the airfoil calibration can be executed starting at block 516. Airfoil calibration can aid in optimizing airfoil angular displacement from any inner and/or outer wheels on a wind turbine based on the wind speed. At block 516, the wind speed or other variables can be determined, and the airfoils can be adjusted accordingly at block 518. Different wind turbine designs (which may differ based on, e.g., wind turbine type, materials, size, strength, gear settings, power transfer capabilities, airfoil size and quantity, among other variables) may include a processor specially configured to adjust the respective airfoils differently than other wind turbines based on the same wind speed.

For example, when the wind speed is relatively high and likely to cause instability for a particular design of wind turbine, some types of airfoils can be adjusted to decrease the perpendicularity of the airfoil with respect to the wind direction. Additionally or alternatively, some types of airfoils can be adjusted to decrease the amount lift created. An advantage of this would be to help increase stability of the wind turbine system during relatively high wind speed conditions. As another example, the same wind speed may be relatively low for a different wind turbine design, and the processor of this wind turbine can be configured to increase the angle perpendicularity of some types of airfoils with respect to the wind direction, resulting in a consistent rotational speed for the turbine despite the lower wind speed.

At block 520, another delay could be implemented, after which the process could be repeated starting at block 504 by calculating the wind speed direction again.

Method 500 can be used to continuously monitor wind conditions and adapt the operation of the wind turbine accordingly to optimize its efficiency. Although FIG. 5 illustrates one example of a method for controlling a wind turbine, various changes may be made to FIG. 5. For example, while shown as a series of steps, various steps in FIG. 5 may overlap, occur in parallel, occur in a different order, or occur multiple times. As another example, method 500 may be divided into separate processes that run independently for additional optimization to control the turbine direction and airfoil direction, respectively.

The delays in method 500 could be adjusted to prevent too much or too little movement of the wind turbine system. An advantage of this would be to optimize the movement of the wind turbine system with respect to the limitations of the motors used to manipulate the wind turbine and airfoil movement. Method 500 can be modified based on, e.g., individual wind and weather conditions and/or particular operational uses of the wind turbine system. For example, if the wind turbine is placed in an environment where wind speed and wind direction change only slightly or are likely to not damage the type of wind turbine being used, then method 500 may be adjusted accordingly to remove inefficiencies potentially caused by some of the time delays.

An equation to determine power based on density of air ("d"), turbine blade diameter ("D"), velocity or speed of wind ("v"), and a design-specific constant ("C") is shown below.

$$\text{Power} = d * D^2 * v^3 * C \qquad \text{[Eqn. 1]}$$

As an example, some of the embodiments described herein might have properties such that the power generated at various wind speeds varies, such as 4,000 units of power at 10 miles per hour wind and 256,000 units of power at 40 miles per hour wind.

Figure 6:
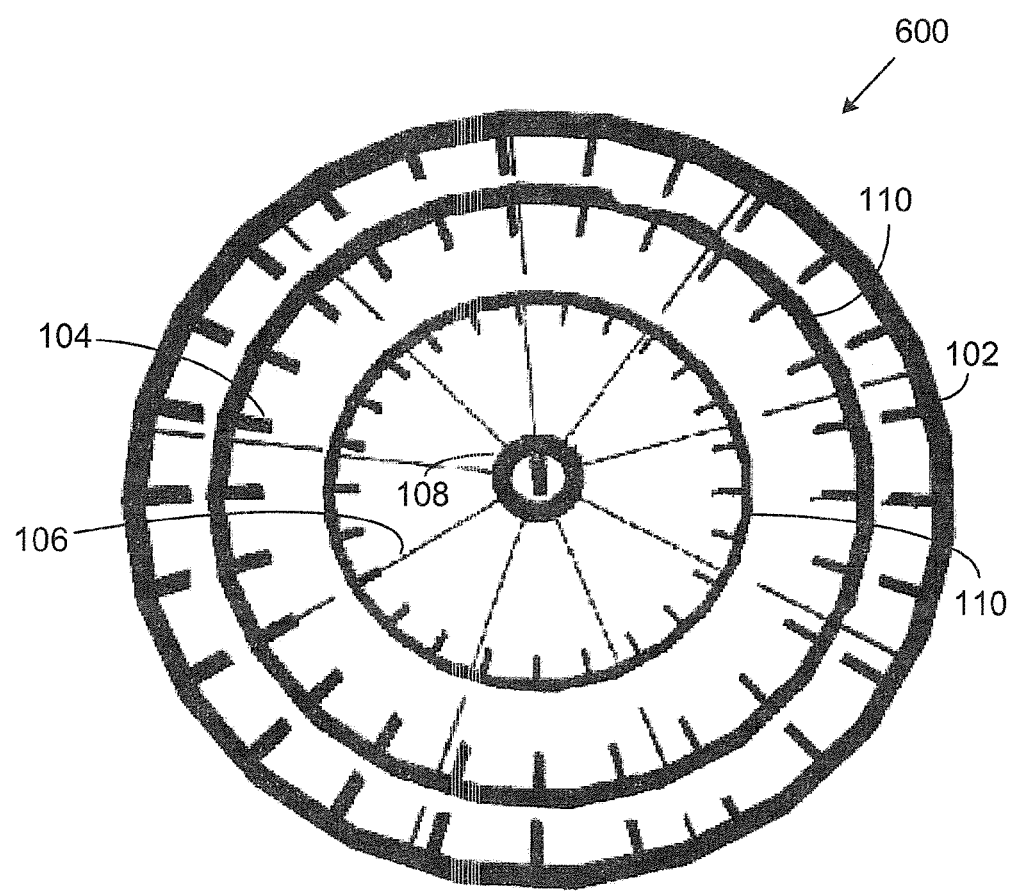
FIG. 6 illustrates a front view of a rotating assembly with multiple wheels, each with a plurality of airfoils, according to an embodiment of the present disclosure.

FIG. 6 illustrates a front view of a rotating assembly with multiple wheels, each with a plurality of airfoils, according to an embodiment of the present disclosure. The embodiment of rotating assembly 600 shown in FIG. 6 is for illustration only. Other embodiments of rotating assembly 600 could be used without departing from the scope of this disclosure.

Rotating assembly 600 includes one or more inner wheels 110, each of which may include airfoils 104. In this embodiment, radial supports 106 can connect outer wheel 102 with an inner wheel 110, an inner wheel 110 with another inner wheel 110, and/or an inner wheel 100 with magnetic ring 108.

Figure 7:
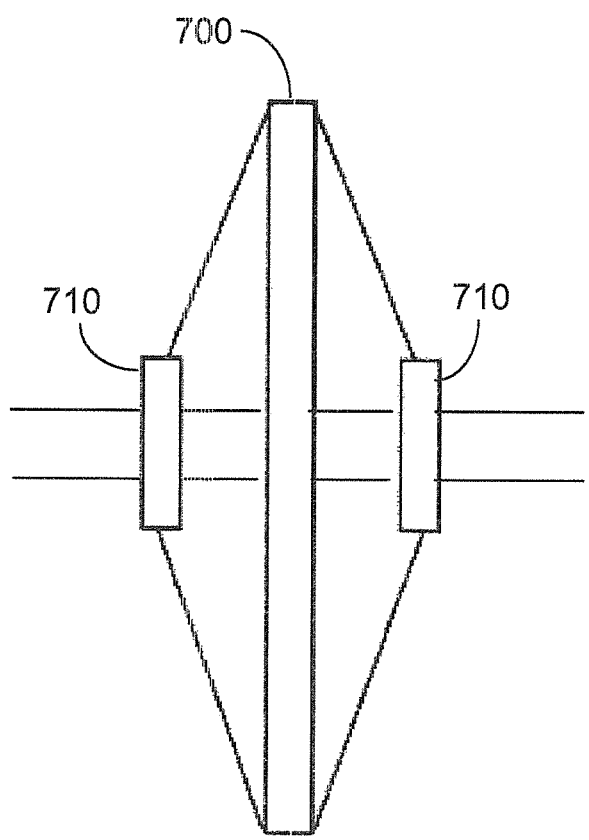
FIG. 7 illustrates a side view of a rotating assembly with two magnetic rings, according to an embodiment of the present disclosure.

FIG. 7 illustrates a side view of a rotating assembly with two magnetic rings, according to an embodiment of the present disclosure. Single rotating assembly 700 is coupled to two magnetic rings 710 disposed on opposite sides of rotating assembly 700. Having multiple magnetic rings increases the magnetic field change. While FIG. 7 shows two magnetic rings 710 coupled to rotating assembly 700, in other embodiments, more than two magnetic rings may be coupled to rotating assembly 700.

In some embodiments, a protective shell may be formed around the electrical coil, magnets, and slip ring assembly to protect them from the elements. The protective shell may be used in environments where the wind turbine can be exposed to extremely cold temperatures, snow, ice, or freezing rain. The protective shell may also be useful in coastal regions to protect the wind turbine elements from salt, other minerals, or blowing rain.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims. Although specific terms are employed herein, they are used in a generic and descriptive sense only and not for purposes of limitation.

What is claimed is:

1. A wind turbine, comprising:
    a central rod comprising an electrical coil;
    at least one rotating assembly configured to rotate around the central rod, the rotating assembly comprising a wheel and a plurality of airfoils disposed around a perimeter of the wheel; and
    a magnet coupled to the at least one rotating assembly and configured to rotate around the central rod;
    wherein the at least one rotating assembly comprises a plurality of rotating assemblies arranged coaxially, each rotating assembly coupled to a different magnet;
    wherein each of the plurality of rotating assemblies has a different outer diameter, the rotating assemblies further arranged such that the outer diameters of the rotating assemblies decrease in a direction that wind travels.

2. The wind turbine of claim 1, wherein the magnet comprises a magnetic ring that surrounds the central rod and is coupled to the at least one rotating assembly such that the at least one rotating assembly and the magnet rotate at a same angular velocity.

3. The wind turbine of claim 1, wherein the airfoils are configured to adjust according to a wind speed.

4. The wind turbine of claim 1, further comprising an outer shell surrounding the plurality of rotating assemblies.

5. The wind turbine of claim 1, further comprising:
    a support structure coupled to the central rod; and at least one wire passing through the support structure and coupled to the central rod, the at least one wire configured to carry generated electrical power from the central rod.

6. The wind turbine of claim 1, wherein the airfoils are disposed on an outer rim of the wheel and are arranged to capture wind moving substantially perpendicular to the center rod.

7. The wind turbine of claim 1, wherein the airfoils on the rotating assemblies are configured to optimum efficiency for different wind speeds.

8. The wind turbine of claim 1, wherein a first one of the plurality of rotating assemblies is coupled to the center rod such that the central rod rotates with the first rotating assembly.

9. The wind turbine of claim 8, wherein at least one second rotating assembly rotates in a direction opposite a direction of rotation of the first rotating assembly and the central rod.

10. A method of operating a wind turbine, the method comprising:
rotating at least one rotating assembly around a central rod, the central rod comprising an electrical coil, the rotating assembly comprising a wheel and a plurality of airfoils disposed around a perimeter of the wheel; and
rotating a magnet around the central rod, the magnet coupled to the at least one rotating assembly;
wherein the at least one rotating assembly comprises a plurality of rotating assemblies arranged coaxially, each rotating assembly coupled to a different magnet;
wherein each of the plurality of rotating assemblies has a different outer diameter, the rotating assemblies further arranged such that the outer diameters of the rotating assemblies decrease in a direction that wind travels.

11. The method of claim 10, wherein the magnet comprises a magnetic ring that surrounds the central rod and is coupled to the at least one rotating assembly such that the at least one rotating assembly and the magnet rotate at a same angular velocity.

12. The method of claim 10, further comprising adjusting the airfoils according to a wind speed.

13. The method of claim 10, further comprising:
receiving air through an outer shell surrounding the plurality of rotating assemblies.

14. The method of claim 10, wherein a support structure is coupled to the central rod and at least one wire passes through the support structure and is coupled to the central rod, the method further comprising:
carrying generated electrical power from the central rod through the at least one wire.

15. The method of claim 10, further comprising:
capturing wind moving substantially perpendicular to the center rod at the airfoils, the airfoils disposed on an outer rim of the wheel.

16. The method of claim 10, further comprising the airfoils on the rotating assemblies are configured to optimum efficiency for different wind speeds.

17. The method of claim 10, wherein a first one of the plurality of rotating assemblies is coupled to the center rod, the method further comprising rotating the central rod with the first rotating assembly.

18. The method of claim 17, further comprising:
rotating at least one second rotating assembly in a direction opposite a direction of rotation of the first rotating assembly and the central rod.

* * * * *